United States Patent
Ortlieb

(10) Patent No.: US 11,930,903 B2
(45) Date of Patent: Mar. 19, 2024

(54) BAG, BASKET OR CONTAINER

(71) Applicant: Hartmut Ortlieb, Heilsbronn (DE)

(72) Inventor: Hartmut Ortlieb, Heilsbronn (DE)

( * ) Notice: Subject to any disclaimer, the term of this patent is extended or adjusted under 35 U.S.C. 154(b) by 360 days.

(21) Appl. No.: 17/427,431

(22) PCT Filed: Feb. 3, 2020

(86) PCT No.: PCT/DE2020/000014
§ 371 (c)(1),
(2) Date: Jul. 30, 2021

(87) PCT Pub. No.: WO2020/160723
PCT Pub. Date: Aug. 13, 2020

(65) Prior Publication Data
US 2022/0135162 A1    May 5, 2022

(30) Foreign Application Priority Data
Feb. 8, 2019 (DE) ...................... 20 2019 000 626.5

(51) Int. Cl.
A45C 11/20 (2006.01)
A45C 3/04 (2006.01)
(Continued)

(52) U.S. Cl.
CPC ............. *A45C 11/20* (2013.01); *A45C 3/04* (2013.01); *A45C 7/0077* (2013.01); *A45C 13/02* (2013.01);
(Continued)

(58) Field of Classification Search
CPC ............. B62J 9/21; B65D 2543/00435; B65D 2543/0062; B65D 2543/00601; B65D 2543/00611; B65D 2543/00648
See application file for complete search history.

(56) References Cited

U.S. PATENT DOCUMENTS

| 3,396,885 A | 8/1968 | Leona |
| 4,460,114 A | 7/1984 | Grenier |

(Continued)

FOREIGN PATENT DOCUMENTS

| DE | 29503004 U1 | 4/1995 |
| DE | 29507304 U1 | 8/1995 |

(Continued)

OTHER PUBLICATIONS

PCT/DE2020/000014, Written Opinion and International Search Report dated Feb. 8, 2019, 12 pages—English, 15 pages—German.

*Primary Examiner* — Scott T McNurlen
(74) *Attorney, Agent, or Firm* — Andrew F. Young; Nolte Lackenbach Siegel

(57) ABSTRACT

The invention relates to a bag, basket, or container (1), with a substantially trough- or basket-shaped design having a rigid and/or reinforced base region (2), a circumferential side wall (3), and an upper region (4) which is open or can be opened, and is provided in this region which is open or can be opened with a rigid, substantially oval, elongated or rectangular circumferential frame (5) or reinforcement, and the frame has, on at least the surface facing away from the interior, a substantially circumferential groove (6) or edge for receiving a tightening and/or retaining means (7) of a sealing cover and/or for receiving a sealing cover (8).

5 Claims, 4 Drawing Sheets

(51) Int. Cl.
*A45C 7/00* (2006.01)
*A45C 13/02* (2006.01)
*B62J 9/21* (2020.01)
*B62J 9/23* (2020.01)
*B62J 9/28* (2020.01)

(52) U.S. Cl.
CPC . *B62J 9/21* (2020.02); *B62J 9/23* (2020.02); *B62J 9/28* (2020.02)

(56) References Cited

U.S. PATENT DOCUMENTS

| | | | | |
|---|---|---|---|---|
| 5,282,554 | A | * | 2/1994 | Thomas ..................... B62J 9/21 224/431 |
| 5,533,361 | A | * | 7/1996 | Halpern ................ B62B 3/1464 62/457.2 |
| 8,342,354 | B2 | * | 1/2013 | Letica ................ B65D 43/0212 206/508 |
| 2010/0122994 | A1 | * | 5/2010 | Chuang ..................... B62J 9/21 224/558 |
| 2010/0133309 | A1 | * | 6/2010 | Lee ............................ B62J 9/21 224/420 |
| 2017/0247151 | A1 | * | 8/2017 | Chiou .................. B65D 43/163 |

FOREIGN PATENT DOCUMENTS

| | | | |
|---|---|---|---|
| DE | 29603411 | U1 | 4/1996 |
| DE | 29813870 | U1 | 11/1998 |
| DE | 202007004608 | U1 | 7/2007 |
| DE | 202009018267 | U1 | 8/2011 |
| DE | 202012102641 | U1 | 10/2012 |
| DE | 10201119446 | A1 | 5/2013 |
| DE | 202014100015 | U1 | 3/2014 |
| DE | 202014010618 | U1 | 4/2016 |
| JP | 2005306164 | A * | 11/2005 |
| JP | 2005306164 | A | 11/2005 |
| JP | 3153084 | U * | 8/2009 ............. B65D 15/08 |

\* cited by examiner

BAG, BASKET OR CONTAINER

RELATED APPLICATION AND INCORPORATION STATEMENT

This application relates to and claims the priority from Ser. No.: PCT/DE2020/000014 filed Feb. 3, 2020, the entire contents of which are incorporated herein by reference in their entirety, which in turn claims priority from DE Ser. No.: 20 2019 000 626.5 filed Feb. 8, 2019.

FIGURE SELECTED FOR PUBLICATION

FIG. 1

BACKGROUND OF THE INVENTION

Field of the Invention

The present invention relates to a bag, a basket, or a container, particularly formed for use on a vehicle, such as a bike or trike, with a substantially trough- or basket-shaped design having a rigid and/or reinforced base region, a circumferential side wall, and an upper region which is open or can be opened, in which the bag, the basket, or the container has retaining or fastening means or is equipped for such, for reversible attachment to a carrier or a mount on a vehicle.

Description of the Related Art

There are various baskets or bags known for the aforementioned use which can also be attached to bicycles for transport, for example by means of retainers or adapters provided. Such bags or baskets are known particularly as bicycle baskets for attachment to a bicycle luggage carrier or to the handlebars. Oftentimes, such bicycle baskets are formed relatively stably as wire baskets which are then durably mounted to the rear luggage carrier of a bicycle. Shopping bags or handbags also to be transported are then stored in or attached to the basket during travel to carry them. The design of the known bicycle baskets in this case is very open for example, as obtained in the design according to DE 20 2014 100 015 U1, which has relatively few rods and struts and in which it is provided to transport objects or items purchased to be carried, in turn, in bags or other containers. Also known are baskets which are likewise durably mounted to the bicycle and which have finely meshed grid structures made of metal or plastic for the basket body. Such a design is shown in DE 20 2014 010 618 U1, in which the basket can be mounted on the handlebars or the seat posts of a bicycle. In this case, the aforementioned baskets are considered to be transport options formed on the bicycle for purchases or other items to be transported; the simultaneous use in this case as a shopping basket or shopping bag is usually not possible or only to a limited extent. Although shopping baskets or shopping bags, as disclosed in a design according to DE 20 2012 102 641 U1, provide better handling for shopping, they often have no or insufficient stability and retention or attachment options for transport on a bicycle.

A disadvantage with the known bicycle baskets, bags, or shopping bags is, furthermore, the lack of protection against environmental or weather influences such as rain or snow on the contents of the basket, which is due to the open access or opening in the bags or baskets. In addition, even when there are baskets or bags known which are equipped with a so-called snow guard, in which a sealing cover is arranged over the basket and said sealing cover can be gathered together in the middle, these sealing covers fail during longer trips in the rain or snow. In this case, the water remains on the cover and cannot drain off and, after a while, it penetrates through the cover or the gathering area of the sealing cover into the interior of the basket as well and damages the contents.*

ASPECTS AND SUMMARY OF THE INVENTION

It would be desirable to have the option of using a basket which can be securely transported on the bicycle as the shopping basket or shopping bag.

Thus, the object of the present invention is to avoid the disadvantages of the known bicycle baskets and to obtain an improved basket or bag, which is designed to be correspondingly lightweight, has sufficient stability for attachment to the bicycle or a different vehicle, and has an easy-to-handle attachment device for reversible attachment of the basket or the bag to the bicycle.

This object is achieved with the features of the characterizing portion of claim 1. Refinements and advantageous designs of the invention are contained in the further claims.

According to the invention, a bag, basket, or container is formed with a substantially trough- or basket-shaped design having a rigid and/or reinforced base region, a circumferential side wall, and an upper region which is open or can be opened, which is designed in this region which is open or can be opened with a rigid, substantially oval, elongated, or rectangular circumferential frame or reinforcement, in which the frame has, on at least the surface facing away from the interior, a substantially circumferential groove or edge for receiving a tightening and/or retaining means of a and/or for a sealing cover, which is particularly rain-tight.

Particularly also according to the invention, a bag, a basket, or a container, particularly formed for use on a vehicle, such as a bike or trike, with a substantially trough- or basket-shaped design having a rigid and/or reinforced base region, a circumferential side wall, and an upper region which is open or can be opened, in which the bag, the basket, or the container has retaining or fastening means or is equipped for such, for reversible attachment to a carrier or a mount on a vehicle, in which, in the area of the upper region which is open or can be opened, the bag or basket is formed with a rigid, substantially oval, elongated, or rectangular circumferential frame, in which the frame has, on at least its surface facing away from the interior, a substantially circumferential groove for receiving a tightening and/or retaining means for a sealing cover, which is rain-tight.

The circumferential frame, which is preferably made from a metallic material, is preferably designed as an aluminum extruded part, has a further circumferential groove on its surface facing the interior, the actual body of the bag and/or basket being attached in said groove by means of a click keder (keder is an edge reinforcement and KEDER SOLUTIONS® is a trademark of Keder Solutions LLC, of Milwaukee, Wisconsin), to which the preferably flexible bag body is sewn. The aforementioned click keder in this case can also be designed as a sliding keder or keder with additional clamping element. The body of the bag, which is designed from a preferably water-tight, flexible fabric, which is provided with a water-tight seal at its seams, is sewn or welded to the click keder or an alternative keder design, in which the seam extends to outside of the raindrop region.

In a preferred design, the body of the bag is preferably attached, in a sealing manner, by means of the click keder sewn thereto, in a groove of the circumferential, stable frame, which groove is facing the interior. The body of the bag extends from the upper frame element to a bag or basket base, to which the body of the bag is preferably connected in a water-tight manner, such as welded, screwed, riveted, or using a similar process. The base itself in this case is preferably rigid and/or designed with means having reinforcements and has supporting feet and/or at least one retaining device on its lower side for attaching the basket or the bag to a carrier of a bicycle.

The frame, which is preferably made of metal and particularly aluminum in this case, has a further groove on its surface facing away from the interior, in which groove a tightening means can be incorporated correspondingly, which is preferably formed as a rubber clamp and, in the preferred design, is preformed or sewn or welded to a rain-tight sealing cover for arrangement over the basket or bag opening. The rubber clamp in this case seals off the sealing cover at the groove of the outer surface of the circumferential frame, whereby rainwater falling on the sealing cover runs along the sealing cover and drops off below on the rubber clamp or clamping element and is effectively prevented from entering the interior of the bag or basket. Alternatively or as a simple variant, a rain-tight sealing cover can also be stretched over the opening region as a simple, rain-tight top cover and covered by means of a rubber clamp, which corresponds to the groove on the outside of the frame.

In a preferred variant, one or more basket accessory elements can be attached to the click keder, to which the body of the bag is attached and which is incorporated, in a sealing manner, in the frame groove facing the interior of the frame. These basket accessory elements are preferably an interior pocket within the basket or retaining elements, for example, for wallets, keys, or the like.

The actual body of the basket or the side walls, which are connected to the body of the basket, are designed to be water-repelling and/or water-tight, but at least repellent to rainwater and, in one design, consisting of individual parts connected to each other, formed to be water-tight at least at the connection points or seams, which is accomplished through welding or coating. The base and/or the base region of the bag, basket, or container in this case is preferably designed to be rigid, in which the actual body of the basket is comparably flexible thereto and/or compressible.

In a further variant, the base region and/or the interior of the basket or bag is insulated such as, for example, with a lining of the base and the inner side walls with an insulating material, which is removable or alternatively is incorporated durably connected to the inner surfaces of the basket. In this design, the basket or the bag can be ideally used as a bag or basket for keeping items cold or hot. In a preferred design, the insulating elements can be removed and the lateral insulating elements or those forming the inner side wall in this case preferably form a lateral reinforcement of the otherwise more flexibly designed body of the basket. In a design to this effect for use as a container for keeping items cold or hot, the entire body of the basket as well as the sealing cover is preferably designed to be air-tight in order to ensure the best-possible insulation of the body interior against the environment. However, particularly in order to provide a seal against rainwater or sweat or other moisture, the connection of the click keder in the groove is formed, in a sealing manner, on the inner surface of the frame.

In the preferred design, but also in the design without insulating elements or side parts in the interior of the basket body, the base and/or the base reinforcement is equipped with at least one form-fitting and/or force-fitting connection means for at least one vertical side-reinforcement means. Normally or in the preferred design, the bag or the basket is equipped with two vertical side-reinforcement means, which are provided preferably reversibly for attachment, and which preferably can be attached to the left and right on the basket as considered in the direction of travel and/or direction of carry.

To this end, the base and/or the base reinforcement has retainers or fastening points, in which a vertical side-reinforcement element can be easily incorporated, and which maintain the shape of the basket body between the upper frame and the base region. Due to the possibility of easily removing the vertical side-reinforcement elements, the basket or the bag can be collapsed as needed to be very compact and space-saving, which is particularly very positive during transport after purchase or for storage and/or for storage of the basket or the bag. The vertical side-reinforcement elements in this case can preferably be incorporated as lateral intermediate elements between the receiving element in the base region and fastening points on and/or under the frame, in which the intermediate element is attached to the frame or to the side wall of the basket, the bag, or the container. A carrying means, which is preferably formed as a carrying handle or carrying strap, can be rotatably attached, in a connecting manner, to the intermediate or retaining elements in each case, at the two intermediate and/or retaining elements opposite as relates to the circumferential frame. The carrying strap can hereby be easily folded away and does not interfere when filling the basket or placing the rain-tight sealing cover it and can be folded upward again at any time for comfortable transport. A locking mechanism provided in the intermediate elements has proven to be advantageous for at least these two positions, which intermediate elements prevent, for example, an unintentional collapse of the carrying strap when the basket is set down. Furthermore, these and all of the aforementioned designs result in a very clean and purist look for the body of the basket. In order to comfortably carry the basket using the carrying strap, it is designed with a U-profile in the gripping region for comfortable grasping.

In its preferred design, the basket is equipped with a position of the sealing cover which enables an intermediate position for the sealing cover over the frame and thus the opening of the basket. To this end, retaining means which correspond to one another are arranged on the sealing cover and on the circumferential frame and/or on the body of the bag or at the intermediate elements. Thus, the sealing cover can be fixed in a position over the frame in which the sealing cover does not completely span the edge of the frame of the opening but instead keeps open a defined access to the interior of the basket. In this position, the basket can be accessed, for example, very comfortably without having to completely open or remove the rain-tight sealing cover.

The base region is preferably designed with supporting feet and/or an attachment device on the surface opposite the interior of the basket or bag for attaching the basket to a carrier, particularly to a luggage carrier of a bicycle or motorcycle or similar vehicle. Thus, the basket can be easily placed on the ground without the complete bottom of the basket becoming dirty.

In the preferred design, the basket is equipped with a retaining device for attaching the basket on or in the area of handlebars, in which the retainer is preferably designed as a handlebar adapter and enables reverse attachment of the basket to a corresponding counterpart on the handlebar of a bicycle. The handlebar adapter of the basket in this case is preferably attached at the stable frame, which forms the circumferential edge of the basket or the bag, and preferably in the form that the handlebar adapter is connected to the frame and/or the ends of the circumferential profile of the frame are stably incorporated and/or can be fixed in the handlebar adapter in an abutting manner or oppositely.

In a further, preferred design, the sealing cover, which has a welding strip, is arranged on or over the handlebar adapter or can be attached above with this welding strip. In this case, the welding strip of the sealing cover is formed to widen, protruding over the handlebar adapter, and the sealing cover is designed with tightening means attached on the edge thereof. The tightening means, preferably formed as a rubber clamp, is preferably attached to the circumferential edge of the sealing cover or connected thereto. Preferably, the sealing cover is welded over the tightening means in a leak-tight manner. Alternatively, a rubber clamp can also generally be put over the sealing cover protruding over the edge of the frame in order to obtain rain protection.

The above and other aspects, features and advantages of the present invention will become apparent from the following description read in conjunction with the accompanying drawings, in which like reference numerals designate the same elements.

BRIEF DESCRIPTION OF THE DRAWINGS

The invention is described in greater detail in the following using drawings purely as examples. The following is shown.

DETAILED DESCRIPTION OF THE PREFERRED EMBODIMENTS

Figure 1:
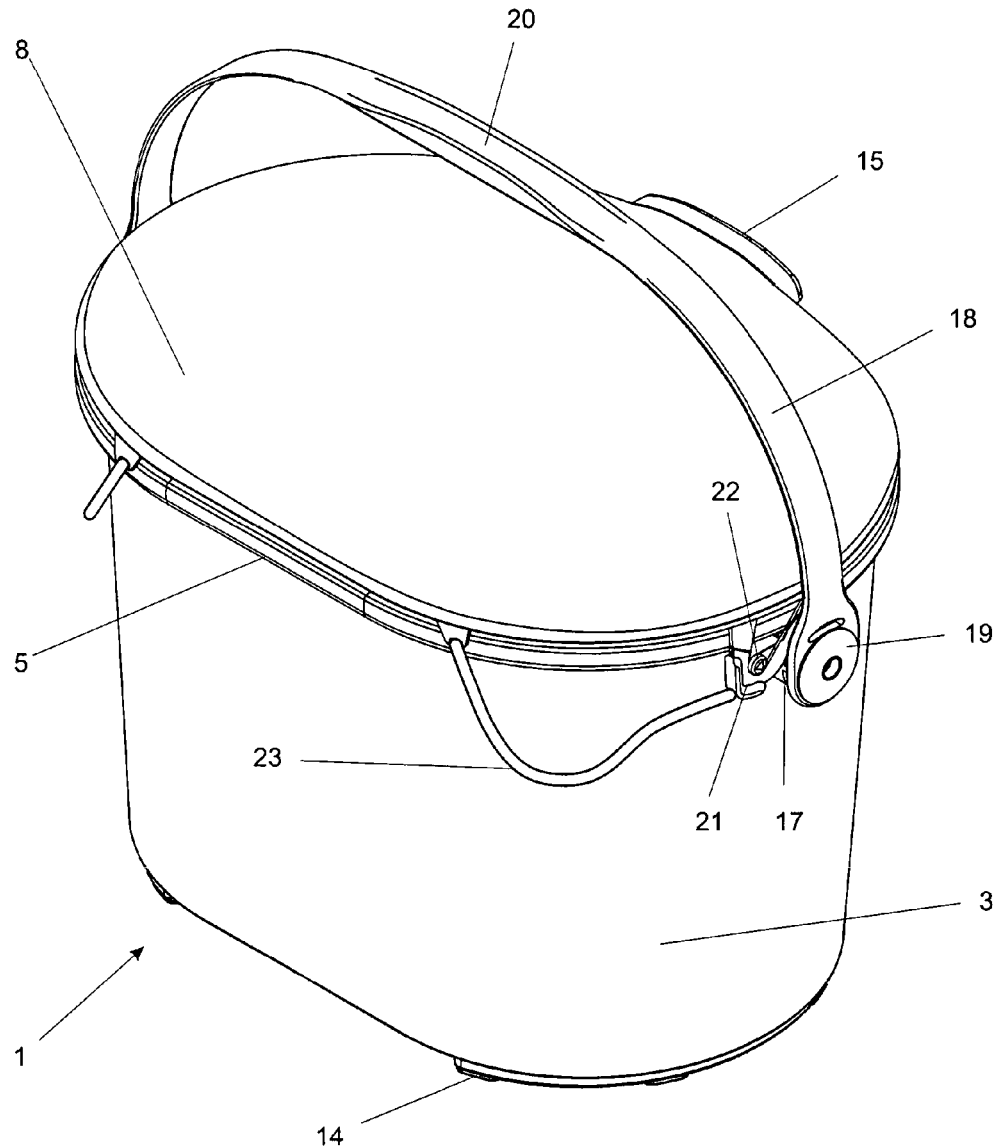
FIG. 1 is a perspective view of a closed basket.

FIG. 1 shows a bag or a basket 1 according to the invention, over the opening region of which a rain-tight sealing cover 8 closing or covering the opening region is clamped. As shown in the design, the basket in this case is formed with a circumferential, rigid oval frame 5, on which the flexible basket body 3 is arranged and/or can be attached, which body consists of a fabric or textile and/or plastic. The sealing cover 8 in this case can be clamped over the frame 5 with a tightening means arranged on the circumference thereof, such as a rubber band or the like, in which the edging thereof engages a groove 6 incorporated on the outside of the frame and is held there. This can also be achieved with an edge arranged on the frame, in a variant which is not shown. The basket body 3 itself is preferably made from a textile or plastic, deformable material, which can be coated, whereby it is at least rain-tight and easy to wash. The basket shown in FIGS. 1 and 2, which can be used, for example, as a shopping basket, has a carrying strap 18 for this, which can be positioned at lateral intermediate elements 17 so as to be rotatable or foldable over the opening of the basket. The intermediate element 17 is attached to the frame 5 and/or to the region of the basket body 3 and has a mount for a washer 19 for attaching the carrying strap 18.

Figure 2:
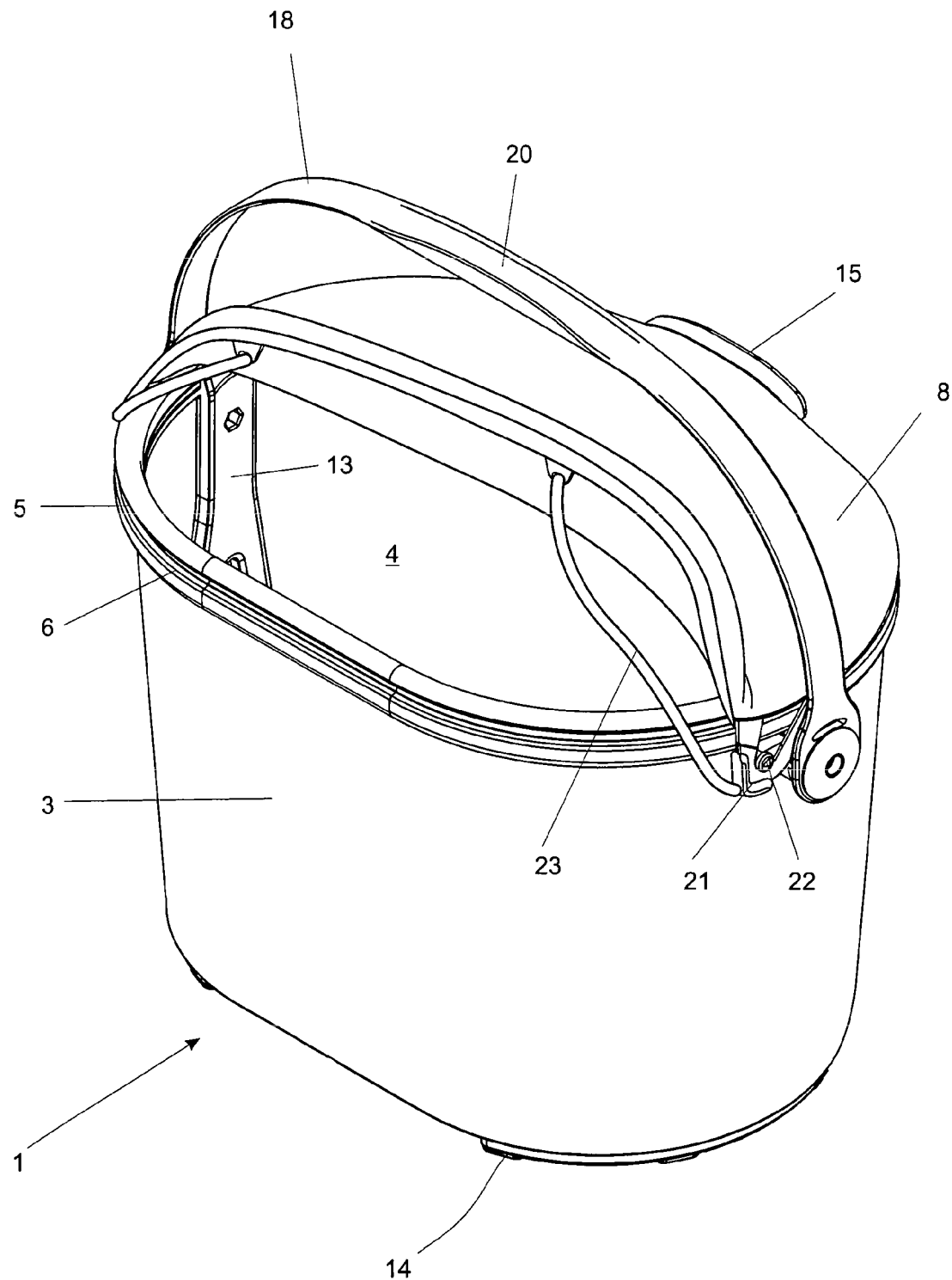
FIG. 2 is a perspective view of partially open basket.

The basket shown in FIGS. 1 and 2 further has the possibility of also fixing the sealing cover 8 in a defined position, which is not completely closed, over the opening region. Simple and quick access to the interior of the basket is possible in this partially open position of the sealing cover over the opening region. To this end, the sealing cover has retaining means 21 on its circumference, which can be fixed correspondingly on the fasteners 22 arranged at the intermediate element 17 and/or on the frame 5. In the design shown, the fasteners are formed like a knob, and the retaining means 21 formed as a loop or eyelet on the circumference of the sealing cover can be clamped using these fasteners and fixed in this position, as shown in FIG. 2.

For simple operation of the sealing cover and precise positioning, the circumference of the sealing cover preferably has at least one handle 23, by means of which the sealing cover can be comfortably stretched over the frame and the edge can be incorporated in the groove or the retaining means can be attached at the fasteners, for partial opening.

Figure 3:
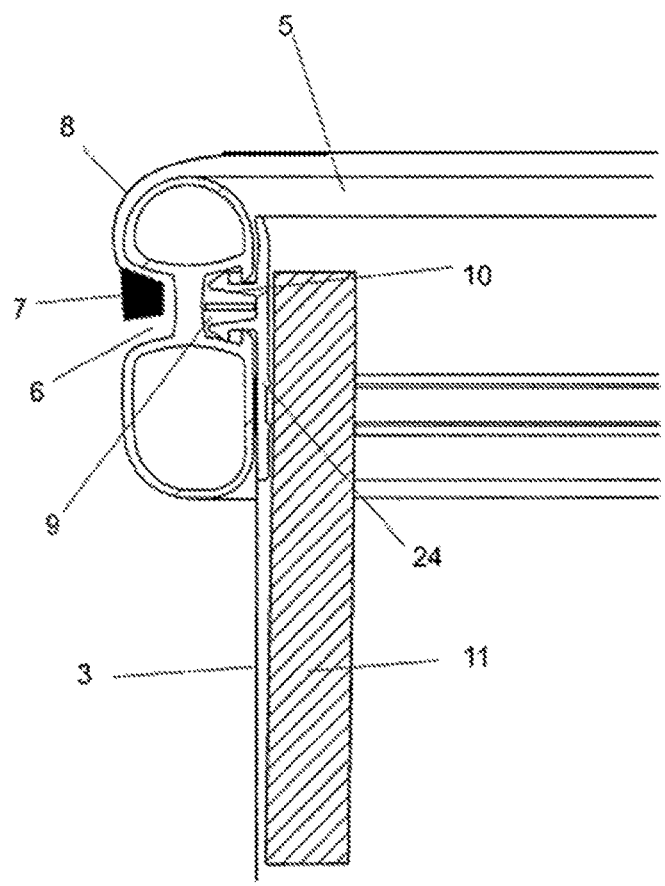
FIG. 3 is a detailed view of the frame with the sealing cover over it and attached basket body.

The detailed view in FIG. 3 shows a section through a basket, in which the frame 5 is seen to have a groove 6 facing away from the interior of the basket. The sealing cover 8 is stretched over the basket and the frame 5 and fixed in the groove 6 with a tightening means 7. In this position, water falling onto the rain-tight sealing cover runs along the side thereof and drops onto the transition and/or end of the sealing cover and tightening means. The basket body 3, or more precisely the side wall 3 thereof, is equipped with an attached, circumferential click keder 10 in its upper opening region, which click keder is sewn and/or welded or bonded to the side edge 3. The click keder 10 engages a groove 9 incorporated on the inner side of the frame 5 and anchors the basket body 3 to the frame 5. Alternatively, the basket body can be attached to the frame as well with a sliding keder or a fixing and tightening means or a threaded connection or adhesive bond.

Due to the position of the sewn region 24 between the click keder 10 and the basket body 3 above the lower edge of the frame, the region of the seam between the click keder 10 and the side wall 3 ends up outside of the raindrop region.

Figure 4:
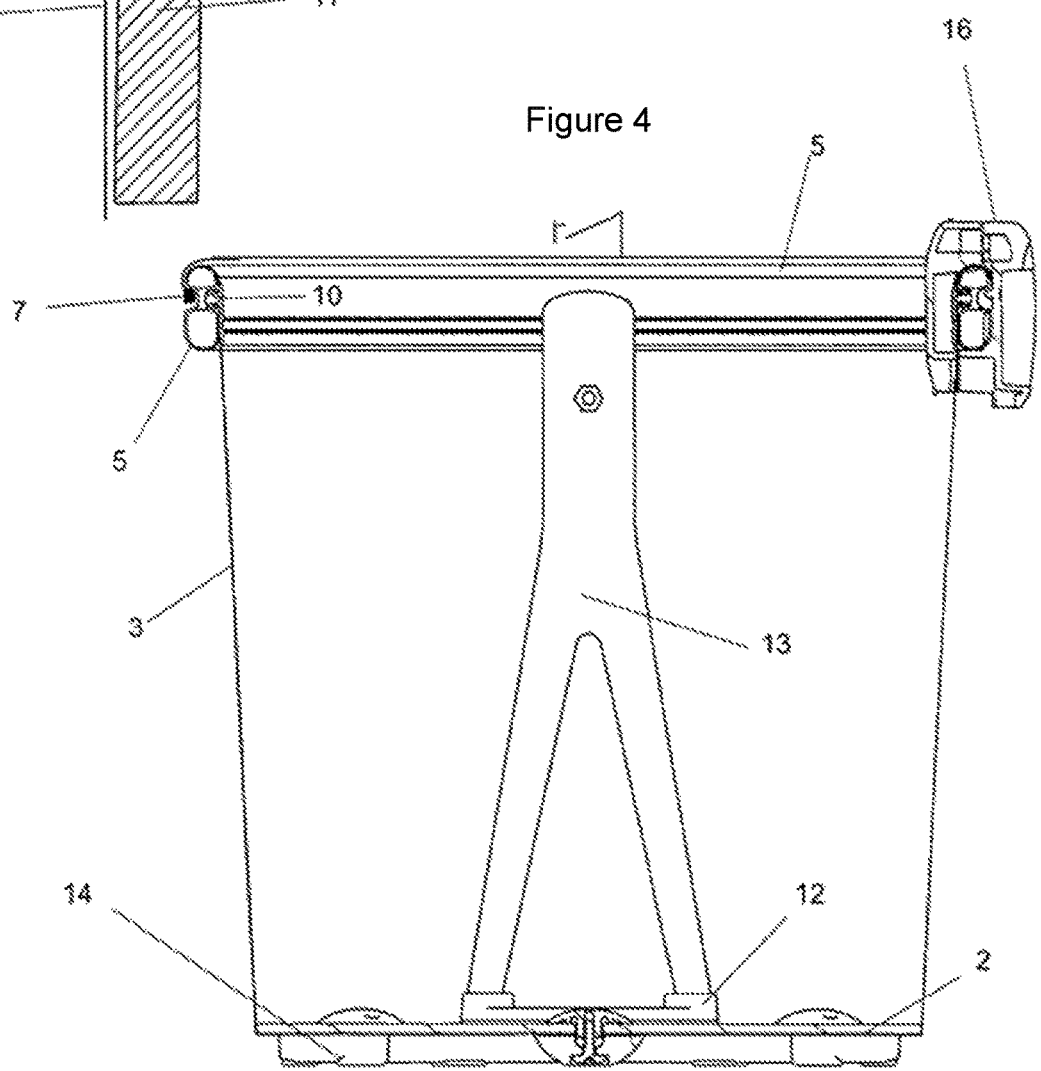
FIG. 4 is a sectional view through a basket.
Figure 5:
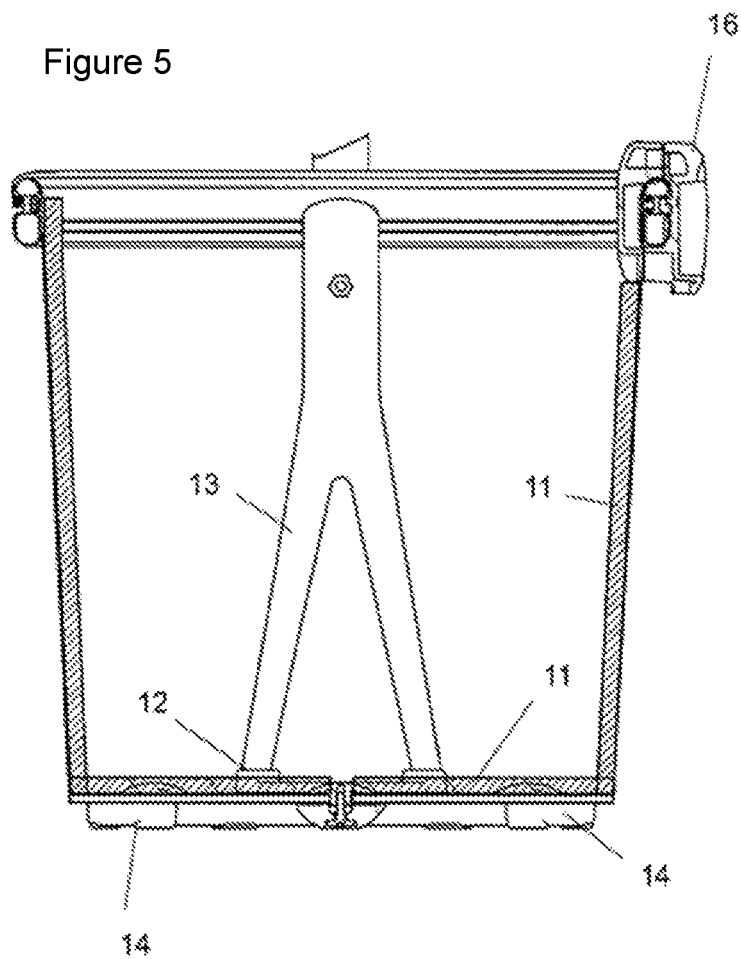
FIG. 5 is a sectional view through a basket with insulation.

Due to the flexible basket body, which consists, for example, of a textile material, the entire basket can very easily be folded together or collapsed and optimally stored, shipped, packaged, or stored in a space-saving manner during longer periods of non-use. In the preferred usage as a bicycle basket and/or shopping basket, however, an at least slight reinforcement of the basket body is beneficial. To this end, vertical reinforcement elements 13 are reversibly arranged in the interior of the basket according to a preferred variant. As shown in FIGS. 4 and 5, the reinforcement elements 13 in this case are detachably arranged between the reinforced base 2 or a reinforcement in the base and the intermediate element 17 on the frame 5 and/or the region of the basket body around the intermediate element. In a design shown in FIG. 4, the vertical reinforcement is formed in the shape of a Y and supported in the base region with two supporting legs in a receiving device 12 arranged at the base region and screwed to the intermediate element in the upper region of said receiving device. In the variant shown, the receiving device 12 is designed as a rigid plate with mount openings for the legs of the reinforcement, which is bolted to the base region. Alternatively, the mount openings can also be shaped or preformed in the rigid base region. In the design shown here, the surface of the base facing away from the interior of the basket body is equipped with supporting legs 14, on which the basket can be placed without the textile outer area of the basket body having to come into contact with dirt and/or moisture or the basket easily slipping off. In a variant which is not shown, the outer base region of the basket is equipped with a retaining device for preferably detachable attachment of the basket to a bicycle carrier or the like or is at least has provisions for this.

In a preferred design as a bicycle basket, a handlebar adapter 16 is arranged on the upper frame 5, by means of which adapter the basket 1 can be detachably attached to a corresponding retaining element on a handlebar and transported. In this case, the ends of the circumferential frame are preferably incorporated in the handlebar adapter 16 and connected thereto and/or the handlebar adapter is bolted to the frame.

Figure 6:
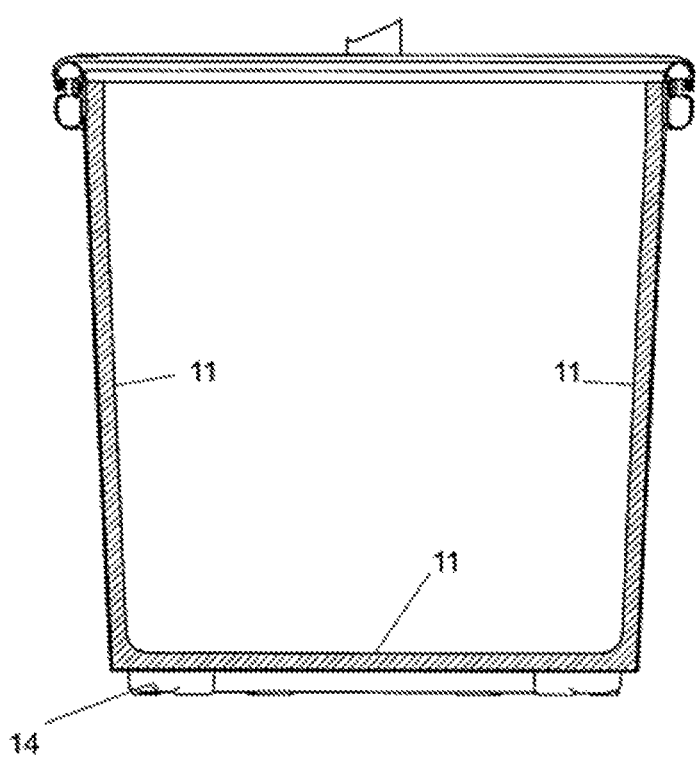
FIG. 6 is a sectional view through a basket with supporting insulation.

In a further preferred design, the basket or the bag is formed as a cooler bag and/or insulated bag or insulated basket or basket with insulating properties in order to transport cold or hot items therein in an insulated manner. To this end, as shown in FIGS. 5 and 6, the interior of the basket body is lined or can be lined with insulating elements 11. In this variant, the basket body 3 is preferably formed from a material impermeable to air and the inner walls of the basket body are lined with an insulating material, which inner walls also take on a vertical supporting function in the interior of the basket body in a variant according to FIG. 6.

Now that the preferred designs of the invention have been described in reference to the accompanying figures, it should be noted that the invention is not limited to these specific designs and that various changes and modifications thereto can be performed by one skilled in the art without leaving the scope of the invention as it is defined in the accompanying claims.

The invention claimed is:

1. A container comprising:
a bounded volume container defining a through-shaped interior with a rigid bottom support and side walls extending upwardly therefrom to an upper region which can be opened during a use;
a rigid frame is formed circumferentially along an upper edge of said upper region;
said rigid frame is positioned about said upper edge of said upper region of said side walls;
said rigid frame includes a substantially circumferential outer groove on an outer rigid frame surface facing away from said interior of said bounded volume container;
a sealing cover having an inwardly facing clamping retaining member positionable in said substantially circumferential outer groove on said rigid frame along said rigid frame surface facing away from said interior of said bounded volume so as to seal said sealing cover to said rigid frame during said use;
the circumferential frame further comprising:
a substantially circumferential inner groove on an inner rigid frame surface facing said interior and opposed to said outer rigid frame surface;
said circumferential inner groove engages with said upper region of said side walls forming said bounded volume; and
said circumferential outer groove facing away from said circumferential inner groove on an opposite side of said circumferential frame;
wherein a projecting keder, being at least one of a sliding keder and a click keder, continuously formed about said upper region of said side walls projecting away from said bounded volume;
said circumferential frame further comprising:
a receiving profile in said circumferential groove engaging with said projecting keder thereby forming a rain-tight sealing cover on said container; and
an insulating layer formed on one of said rigid bottom support, said circumferential side walls and said sealing cover;
wherein said circumferential frame is formed from at least one of a metallic material, a plastic material, and a composite material;
a base reinforcement on said rigid bottom support;
said base reinforcement including supporting feet on an outer surface thereof;
said base reinforcement including at least one force-fitting connection means supporting at least one vertical side-reinforcement means on said interior of said bounded volume container; and
said vertical side-reinforcement means extending from said force-fitting connection means upwardly to said upper region.

2. The container, according to claim 1, further comprising:
an interior pocket on an interior surface of said side walls.

3. The container, according to claim 1, wherein:
said side walls and said sealing cover form an air-tight fit during a use thereof.

4. The container, according to claim 1, further comprising:
at least one retaining device on an exterior surface of said side walls facing away from said bounded interior for attaching said container to one of an external carrier, a bicycle handlebar, and a bicycle frame.

5. The container, according to claim 4, further comprising:
a carrying handle is rotatably attached to said vertical side-reinforcement means through a screw plate on an exterior extension of said vertical side-reinforcement means through a screw plate on an exterior extension of said reinforcing means; and
a locking device including an attachment means operable relative to a knob member on said sealing cover provides an urging sealing force on said inwardly facing clamping retaining member positionable in said outer groove on said rigid frame during said use thereby providing said air-tight fit.

* * * * *